(No Model.)

F. E. LUX.
SELF CLEANING WEED CUTTER.

No. 399,337. Patented Mar. 12, 1889.

Witnesses:
Henry G. Dieterich
R. W. Bishop

Inventor.
Frederick E. Lux
By his Attorneys

UNITED STATES PATENT OFFICE.

FREDERICK E. LUX, OF WALLA WALLA, WASHINGTON TERRITORY.

SELF-CLEANING WEED-CUTTER.

SPECIFICATION forming part of Letters Patent No. 399,337, dated March 12, 1889.

Application filed April 16, 1888. Serial No. 270,880. (No model.)

*To all whom it may concern:*

Be it known that I, FREDERICK E. LUX, a citizen of the United States, residing at Walla Walla, in the county of Walla Walla and Territory of Washington, have invented certain new and useful Improvements in Weed-Cutters, of which the following is a specification.

My invention relates to improvements in devices for cutting weeds, which may be used either as an attachment for harrows and cultivators, or may be used in a frame designed especially for the purpose.

The invention consists in certain novel features, hereinafter described and claimed.

Figure 1:
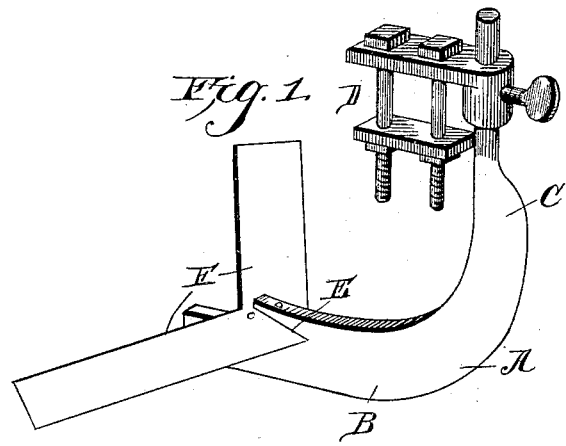
Figure 2:
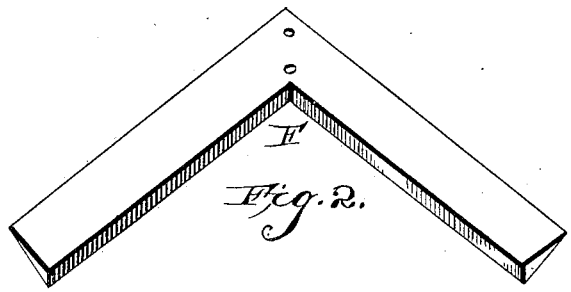
Figure 3:
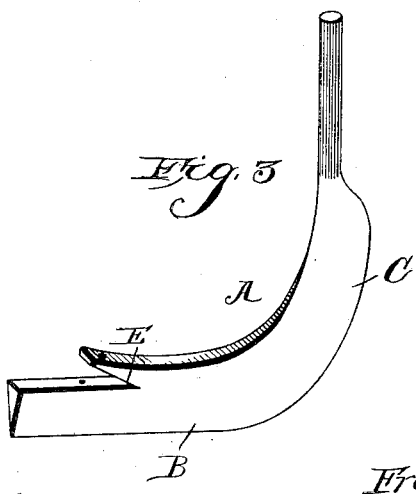

In the accompanying drawings, Figure 1 is a perspective view of my improved weed-cutter. Figs. 2 and 3 are detail perspective views of the colter and the horizontal knife, respectively.

Referring to the drawings by letter, A designates a curved colter or cutter having the horizontal portion B and the vertical portion C, and provided with a cutting-edge upon both of said portions. This colter is provided at its upper end with a clamp, D, by means of which it can be secured to the beam of a cultivator, and in the upper edge of its horizontal portion I provide a notch, E.

F designates a V-shaped horizontal knife having its apex rigidly secured in the notch E of the colter, and having its arms or branches extending outward and rearward therefrom, as shown. The front edge of this knife E is a cutting-edge, as shown.

In practice the colter A is secured to the beam of a harrow or cultivator, or it may, if preferred, be secured to a frame designed especially for that purpose. A number of cutters are secured to each frame, and they are arranged in such relative positions that the knives will not contact with each other while their several paths of travel overlap, thus insuring the cutting of all the weeds, and at the same time preventing the accumulation of the weeds upon the cutters.

The frame carrying the cutters is drawn over the ground in the usual manner, the horizontal knives running under the surface, so as to thoroughly cut up all the weeds.

The device is very simple and its advantages are thought to be obvious.

Having thus described my invention, what I claim, and desire to secure by Letters Patent, is—

The improved weed-cutter consisting of the curved colter A, having the vertical portion C and the horizontal portion B, the front edge of the vertical portion and the lower edge of the horizontal portion being both cutting-edges, and the flat V-shaped horizontal knife rigidly secured at its apex to the upper edge of the horizontal portion of the colter at the rear end of the same, as specified.

FREDERICK E. LUX.

Witnesses:
R. G. PARKS,
JOHN A. TAYLOR.